United States Patent
Godbold et al.

(10) Patent No.: US 10,523,108 B1
(45) Date of Patent: Dec. 31, 2019

(54) SYSTEM AND METHOD FOR PROVIDING RESONANCE DAMPING

(71) Applicant: Deere & Company, Moline, IL (US)

(72) Inventors: Clement V. Godbold, Cary, NC (US); David M. Loken, West Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/374,347

(22) Filed: Apr. 3, 2019

Related U.S. Application Data

(60) Provisional application No. 62/682,612, filed on Jun. 8, 2018.

(51) Int. Cl.
| | | |
|---|---|---|
| *H02J 3/36* | (2006.01) | |
| *H02M 1/14* | (2006.01) | |
| *H02J 1/02* | (2006.01) | |
| *H02M 3/156* | (2006.01) | |

(52) U.S. Cl.
CPC ............. *H02M 1/14* (2013.01); *H02J 1/02* (2013.01); *H02M 3/156* (2013.01)

(58) Field of Classification Search
CPC .............................. H02J 1/02; H05K 1/0216
USPC .......... 363/34–41, 50; 307/11, 102, 105, 149
See application file for complete search history.

(56) References Cited

U.S. PATENT DOCUMENTS

| | | | |
|---|---|---|---|
| 4,434,376 A | 2/1984 | Hingorani | |
| 4,937,719 A | 6/1990 | Yamada et al. | |
| 5,132,894 A | 7/1992 | Rozman et al. | |
| 5,235,503 A * | 8/1993 | Stemmler | H02M 5/4505 363/37 |
| 6,473,284 B1 | 10/2002 | Ilic et al. | |
| 6,842,351 B2 * | 1/2005 | Gauthier | H02J 1/02 363/39 |
| 7,164,263 B2 | 1/2007 | Yakymyshyn et al. | |
| 7,990,097 B2 * | 8/2011 | Cheng | H02M 5/4585 318/800 |
| 8,536,730 B2 * | 9/2013 | Rozman | H02J 1/102 307/11 |
| 2006/0144472 A1 | 7/2006 | Ullakko et al. | |
| 2007/0058704 A1 * | 3/2007 | Alford | H01F 17/0013 375/222 |
| 2011/0186771 A1 | 8/2011 | Hussain et al. | |
| 2012/0242456 A1 | 9/2012 | Tsushima et al. | |

FOREIGN PATENT DOCUMENTS

EP    1475882 A2    11/2004

* cited by examiner

*Primary Examiner* — Rajnikant B Patel

(57) ABSTRACT

A system for providing resonance damping is disclosed. The system comprises a power generation circuit arranged to supply power to a direct current (DC) bus. The DC bus comprises a first link conductor and a second link conductor arranged such that a current induced in either of the conductors generates a magnetic field having a plurality of magnetic flux lines that extend in a direction generally perpendicular to a first direction of current flow. At least one electronic circuit is coupled to the DC bus. A damping element is coupled to or arranged proximate the first link conductor and the second link conductor of the DC bus, and is arranged such that the plurality of magnetic flux lines induces a plurality of eddy currents having a second direction of current flow in at least one surface of the damping element to provide resonance damping of the system.

19 Claims, 5 Drawing Sheets

SYSTEM AND METHOD FOR PROVIDING RESONANCE DAMPING

FIELD OF THE DISCLOSURE

The present disclosure relates generally to damping systems, and, more particularly to systems and methods for providing DC bus resonance damping.

BACKGROUND OF THE DISCLOSURE

In electrical power conversion applications, power switching devices such as voltage source inverters are often used due to their increased efficiency and high power densities. Such power conversion is achieved through the continuous and rapid connection and disconnection of power inputs to achieve desired power outputs. A concern, however, is that high levels of noise are generated due to the rapid switching. Because bus capacitors form resonant circuits with other bus capacitors, high currents flow at and around resonant frequencies, which could lead to significant losses in the bus capacitors and interconnecting conductors if left unaddressed. Such concerns are particularly pronounced in devices with capacitors which have very low internal resistance.

Therefore, to address such concerns, there is a need in the art for a low cost system that is capable of transmitting desirable lower frequency power while damping unwanted higher frequency resonance.

SUMMARY OF THE DISCLOSURE

According to an aspect of the present disclosure, a system for providing resonance damping is provided. The system comprises a power generation circuit configured to supply power to a direct current (DC) bus. The DC bus comprises a first link conductor and a second link conductor. Each of the first link conductor and the second link conductor are arranged such that a current induced in either of the first link conductor or the second link conductor generates a corresponding magnetic field having a plurality of magnetic flux lines that extend in a direction generally perpendicular to a first direction of current flow. At least two power conversion circuits are coupled to the DC bus. A damping element coupled to or arranged proximate to one or both of the first link conductor and the second link conductor, wherein the damping element is arranged such that the plurality of magnetic flux lines induces a plurality of eddy currents having a second direction of current flow in at least one surface of the damping element to provide resonance damping of the system.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
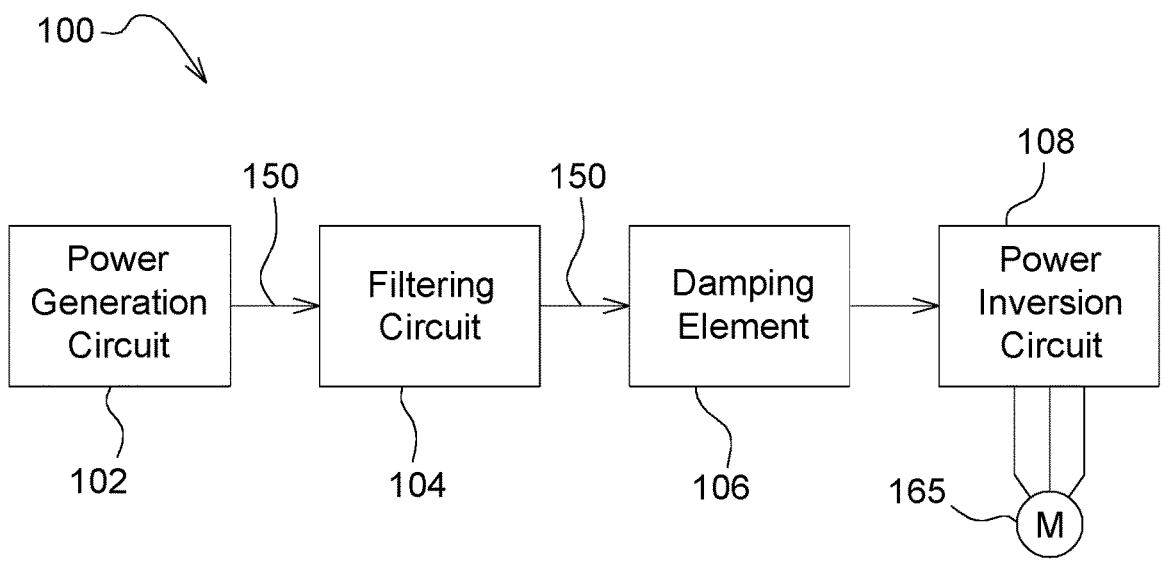
FIG. 1 is a block diagram of a system for controlling a motor according to an embodiment.

Referring to FIG. 1, a system 100 for controlling a motor 165 is shown according to an embodiment. The system 100 can comprise a power generation circuit 102, which can include a direct current (DC) power source, electrically coupled to a filtering circuit 104, at least one damping element 106 and, an electronic circuit such as a power inversion circuit 108 via a DC bus 150. Although not shown, in other embodiments, the power generation circuit 102 can also comprise an alternating current (AC) power source coupled to a converter device that supplies the required DC power to the DC bus 150.

As depicted in FIG. 1, the filtering circuit 104 can be arranged at an input of the power inversion circuit 108 to reduce unwanted noise and/or the magnitude of ripple voltages presented on the DC bus 150. In some embodiments, the filtering circuit 104 can include a capacitive element coupled in series with a resistive element (refer, e.g., to FIG. 2), but may vary in other embodiments. For example, in other embodiments, the filtering circuit 10 can comprise multiple bus capacitors, inductive elements, RC filters, or other suitable filtering components.

At least one damping element 106 can be electrically coupled to the power inversion circuit 108 and can be arranged to provide damping of resonant frequencies. For example, as will be discussed in further detail with reference to FIGS. 3A-5B, the damping element 106 can be coupled to or disposed in parallel relation between respective DC link conductors. In some embodiments, the power inversion circuit 108 can comprise one or more inverters (FIG. 2) that are configured to perform switching operations to convert the DC bus voltage to an AC output (e.g., a three-phase AC output) for use by an external load such as the motor 165, which can include an asynchronous or synchronous electric machine.

As will be appreciated by those skilled in the art, FIG. 1 is provided merely for illustrative and exemplary purposes and is in no way intended to limit the present disclosure or its applications. In other embodiments, the arrangement and/or structural configuration of system 100 can and will vary. For example, as will be discussed herein, system 100 can comprise a variety of damping elements and circuit configurations, or fewer or more circuit components. Additionally, in some embodiments, system 100 can further comprise overprotection circuitry that is used monitor general bus utilization as well as overload conditions. Further, system 100 is scalable in size and performance (i.e., component sizing and power density can be increased or decreased) based on application and/or specification requirements.

Figure 2:
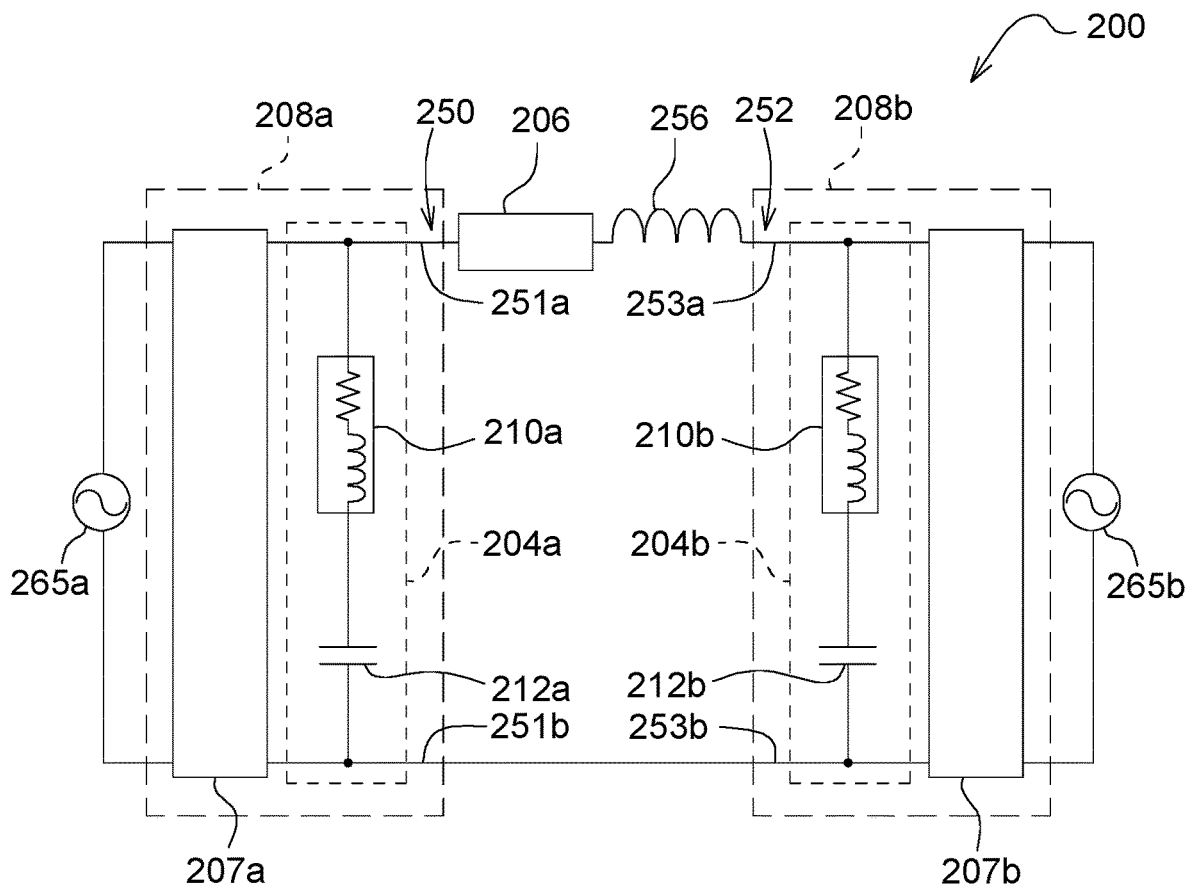
FIG. 2 is a schematic illustration of a dual inverter system including a direct current bus and a damping element according to an embodiment.

Referring now to FIG. 2, a schematic illustration of a DC bus 250, 252 arranged in a dual inverter system 200 is shown according to an embodiment. In embodiments, the dual inverter system 200 can comprise a first power inversion circuit 208a coupled in parallel with a second power inversion circuit 208b via DC link conductors 251a, 251b, 253a, 253b, each of which is arranged to supply the required AC output to the respective electric machines 265a, 265b.

For simplification purposes, in FIG. 2, each the power inversion circuits 208a, 208b are shown as including filtering circuits 204a, 204b and power switching circuits 207a, 207b. In some embodiments, the power switching circuits 207a, 207b can comprise a plurality of switching devices that are configured to generate a specific phase output (e.g., U-phase, V-phase, W-phase) that is supplied to an input of a respective one of the electric machines 265a and 265b. As briefly discussed with reference to FIG. 1, each of the filtering circuits 204a and 204b can comprise at least one bus capacitor 212a, 212b coupled in series with an equivalent series resistor 210a, 210b between the positive and negative link conductors 251a, 251b, 253a, 253b (FIG. 2). For example, as shown in FIG. 2, the DC bus (i.e., DC bus 250, 252) can be electrically coupled to the bus capacitor 212a or 212b through the first and second link conductors 251b and 253b. A resonant circuit can be formed between the filtering components (e.g., capacitors 212a, 212b) arranged in the filtering circuits 204a and 204b and an inductive element 256 of, e.g., the link conductor 251a or 253a.

A damping element 206 can be coupled to the DC bus 250, 252 and is arranged to prevent strong resonant coupling of the filtering components of the resonant circuit. For example, the damping element 206 can be configured to damp high frequency currents that could be stimulated at the input of each of the power inversion circuits 265a, 265b when resonant conditions exist. The damping element 206 can comprise a variety of suitable configurations, as will be discussed in further detail with reference to FIGS. 3A-5, which can be selected based on application and/or design specifications.

Referring to FIGS. 3A-3E, various embodiments of the damping element 206 are shown. In some embodiments, referring now to FIGS. 3A and 3B, a damping element 306 can comprise a first tubular structure 320a and a second tubular structure 320b that are arranged to enclose an outer periphery of a respective DC link conductor 351a, 351b, 353a, 353b. Each of the first and the second tubular structures 320a and 320b can comprise a metallic material or other suitable materials that is capable of conducting eddy currents to facilitate heat dissipation.

Figure 3A:
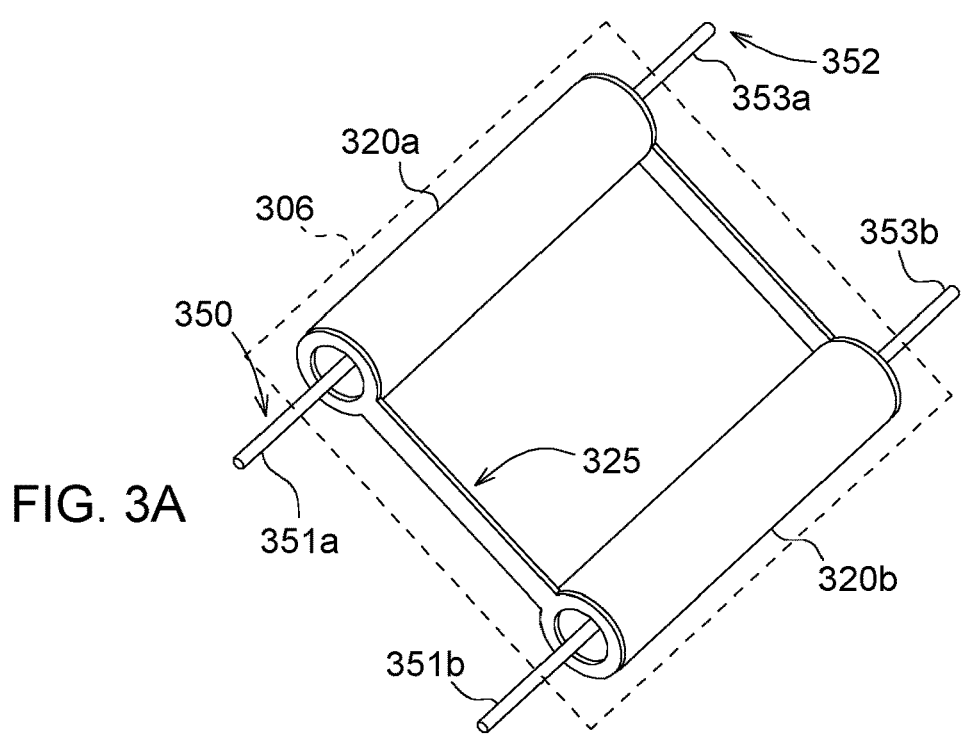
FIG. 3A is a perspective view of a damping element according to an embodiment.
Figure 3B:
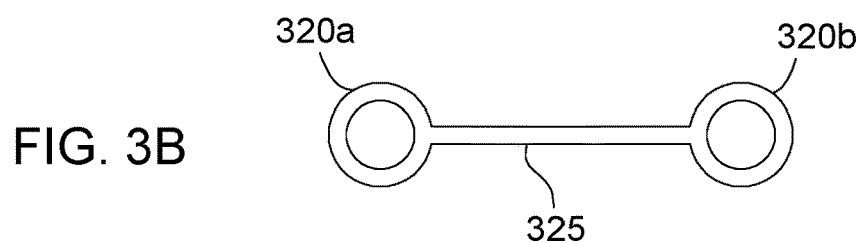
FIG. 3B is a perspective view of a damping element according to an embodiment.

As depicted in FIGS. 3A and 3B, the first tubular structure 320a can be arranged to enclose the first DC link conductors 351a, 353a, and the second tubular structure 320b can be sized to accommodate and enclose the second DC link conductors 351b, 353b. In various embodiments, the structural arrangement of the tubular structures 320a and 320b can vary according to design and specification requirements. For example, in some embodiments, each of the tubular structures 320a and 320b can comprise a metal tube having an inner cross-section that corresponds to a geometrical configuration of the outer periphery of the DC link conductors 351a, 351b, 353a, and 353b.

Figure 3C:
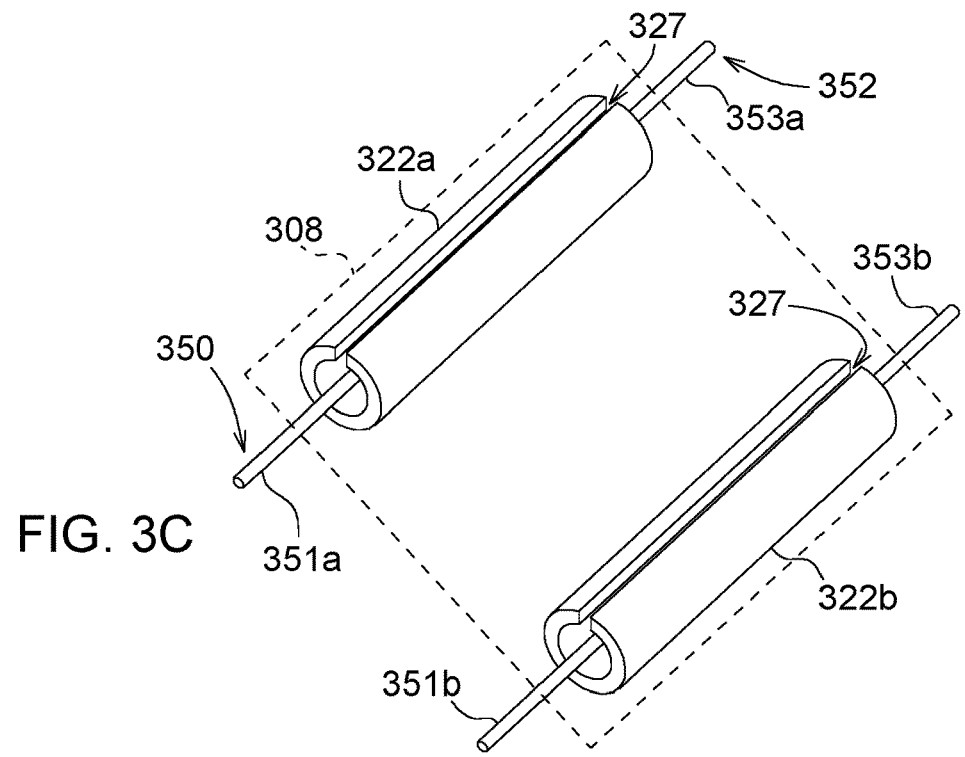
FIG. 3C is a perspective view of a damping element according to an embodiment.
Figure 3D:
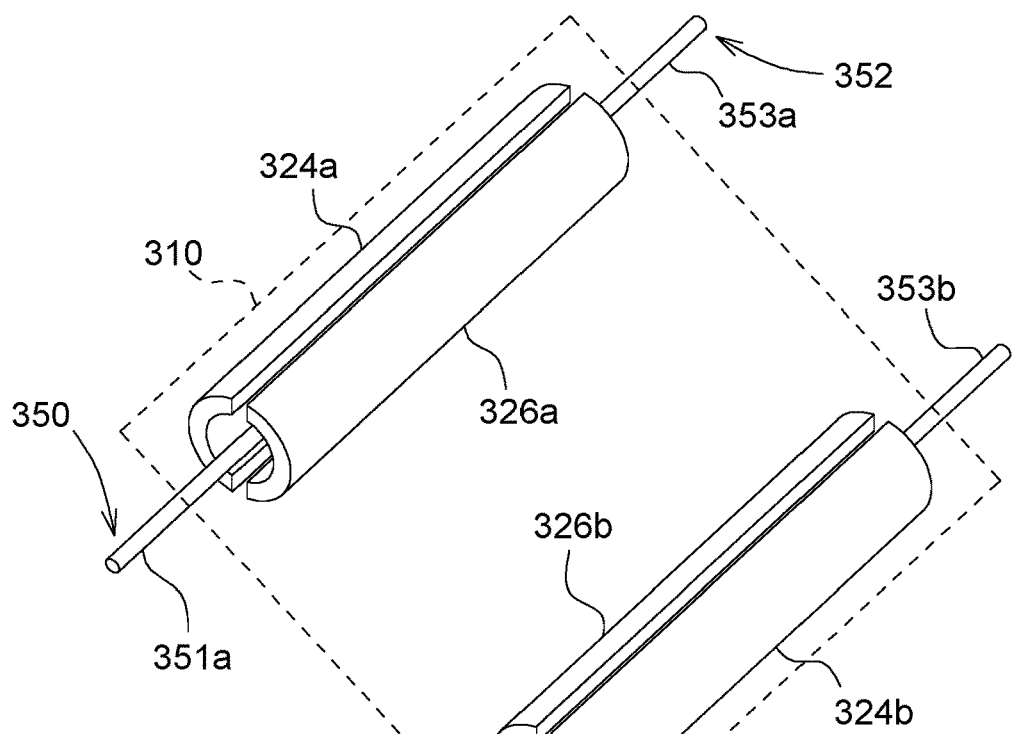
FIG. 3D is a side view of the damping element of FIG. 3A according to an embodiment.

In other embodiments, the damping element can comprise one or more non-continuous structures such as those illustrated in FIGS. 3C and 3D. For example, in one embodiment, a damping element 308 can comprise a non-continuous structure such as tubular structures 322a, 322b each having ferromagnetic or non-ferromagnetic properties, and a gapped portion 327 formed therein (FIG. 3C). Such an arrangement is particularly advantageous, for example, when the tubular structures 322a, 322b comprise ferromagnetic materials because it allows for the cutoff frequency of the damping element 308 to be tuned.

In FIG. 3D, a damping element 310 is shown. In some embodiments, the damping element 310 can comprise tubular structures having two or more of structural elements such as structural units 324a, 326a and 324b, 326b adjacently arranged in spaced relation to one another. Similar to the above embodiment discussed with reference to FIG. 3C, the non-continuous structural arrangement and ferromagnetic properties of the structural units 324a, 326a, 324b, 326b allows for more effective tuning of the cutoff frequency of the damping element 310, and also provides for easier manufacturing and assembling.

Figure 3E:
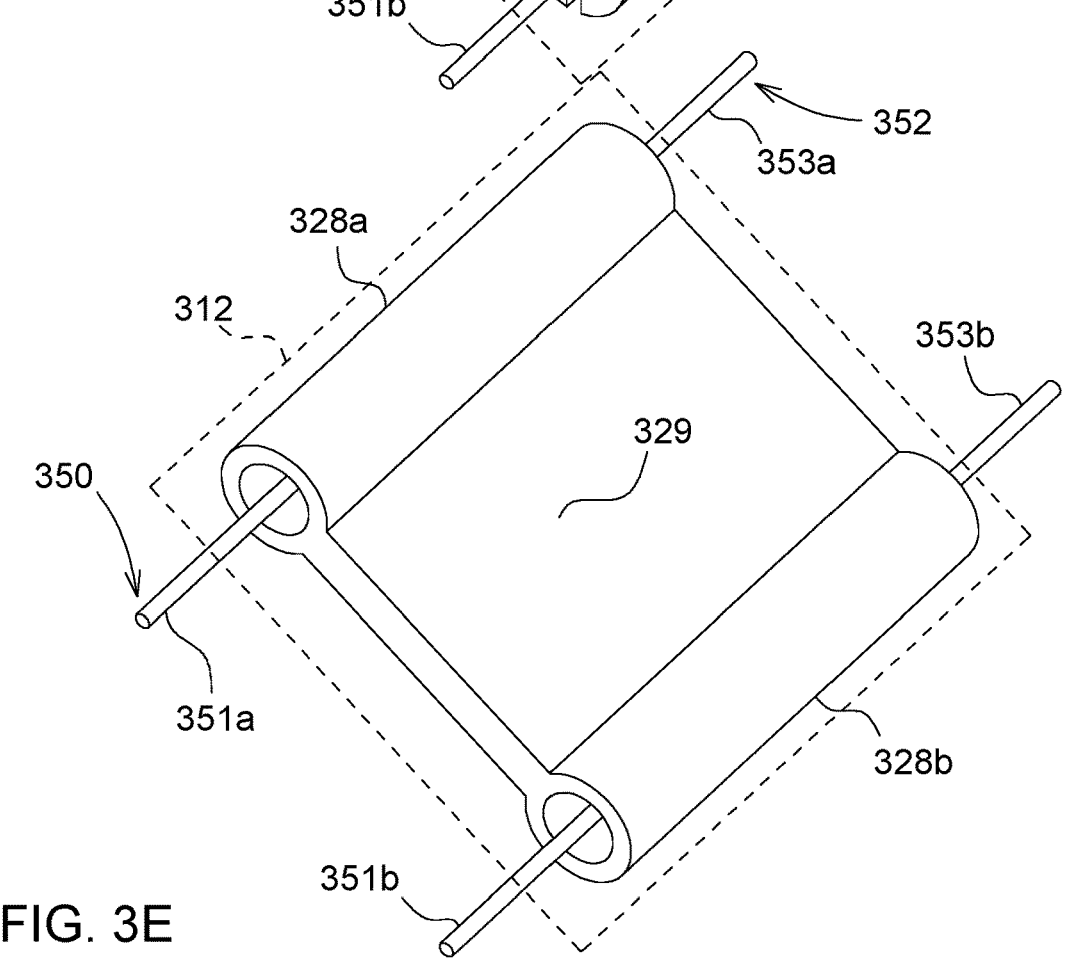
FIG. 3E is a perspective view of a damping element according to an embodiment.

Referring now to FIG. 3E, a damping element 312 is shown, which is substantially similar to the damping element 306 discussed with reference to FIG. 3A. The damping element 312 can comprise one or more tubular structures 328a, 328b coupled together via a coupling element, which, e.g., can include a shorting strap 325 (FIGS. 3A and 3B), or a metallic element 329 (FIG. 3E) such as a metal plate (refer, e.g., to FIG. 4A).

Irrespective of the particular embodiments discussed with reference to FIGS. 3A-3E, it should be noted that, in either of the embodiments, the energy dissipated in the damping effect will not heat the DC link conductors themselves (i.e., it will be thermally decoupled). For example, the heat dissipation of the damping effect will transfer to the first and second tubular structures 320a, 320b rather than to the DC link conductors 351a, 351b, 353a, 353b of the DC bus 350, 352.

Figure 4A:
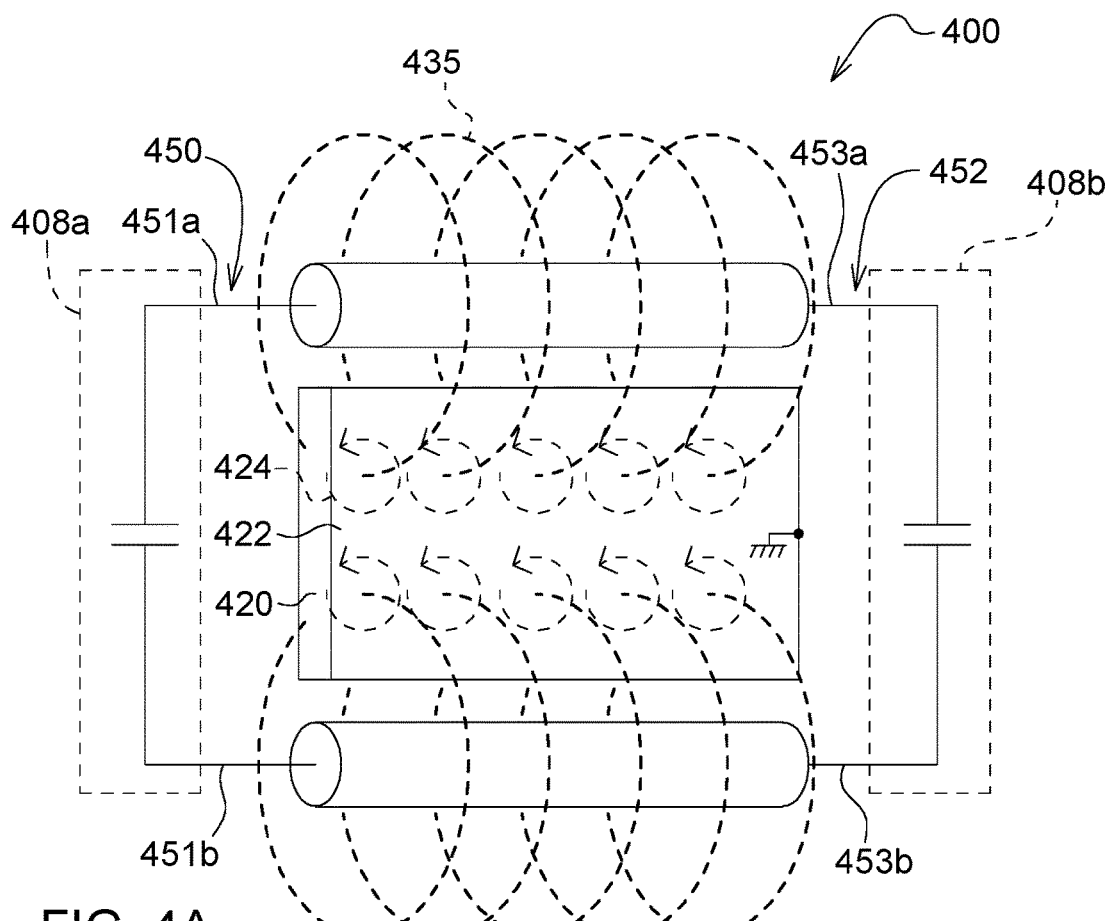
FIG. 4A is a schematic illustration of a dual inverter system including a direct current bus and a damping element according to an embodiment.
Figure 4B:
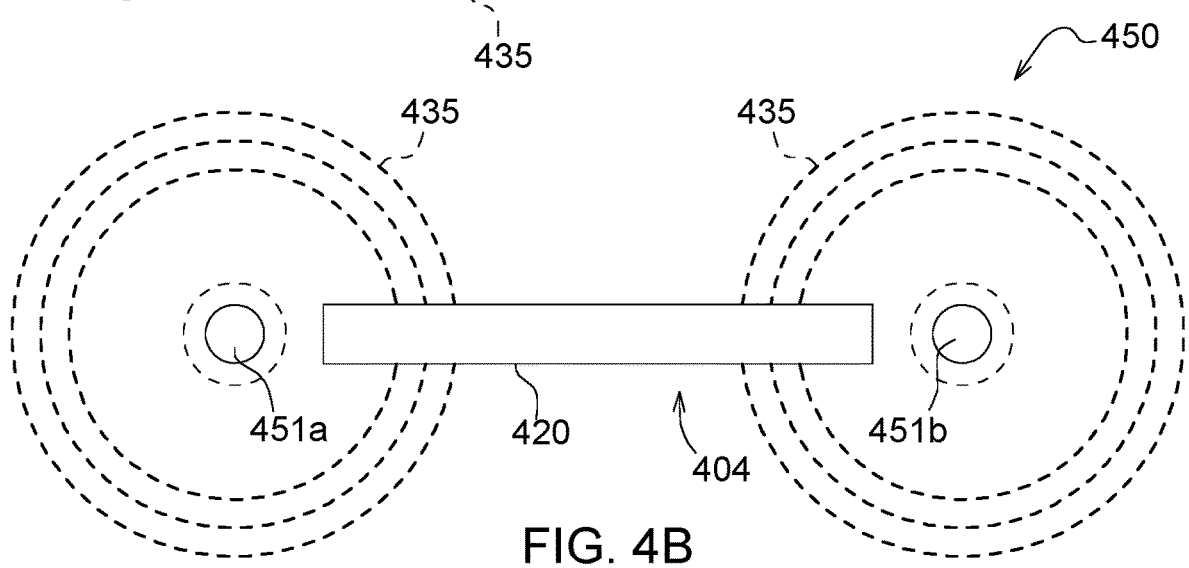
FIG. 4B is a side cross-section view of the direct current bus and damping element of FIG. 4A according to an embodiment.

Referring now to FIGS. 4A-4B, a DC bus 450, 452 for a dual power converter system 400 is shown according to an embodiment. The dual converter system 400 is substantially similar to the dual inverter system 200, therefore similar features will not be discussed in detail. In the embodiment of FIG. 4A, system 400 can comprise a damping element 406 comprising a plate 420 (e.g., a metal plate). The plate 420 can comprise ferromagnetic, non-ferromagnetic, or other suitable materials and can be arranged to intercept magnetic flux generated by the DC link conductors 451a, 451b, 453a, 453b.

As depicted in FIGS. 4A and 4B, the plate 420 can be arranged such that at least one surface of the plate 420 is arranged generally perpendicular to the magnetic flux lines 453 generated by the DC link conductors 451a, 451b, 453a, 453b. For example, the DC link conductors 451a, 451b, 453a, 453b are arranged such that a current induced in the conductors generates a corresponding magnetic field having the plurality of magnetic flux lines 453 that extend generally perpendicular to a first direction of current flow (e.g., in a x-direction). This, in turn, allows for the maximum induction of eddy currents having a second direction of current flow as indicated by the circular lines 424 in FIG. 4A, which, in some embodiments, can be opposite that of the first direction of current flow.

Additionally, as a result of the eddy currents being induced in the plate 420, the heat dissipation will exist in the plate 420 rather than couple to the DC link conductors 451a,

451*b*, 453*a*, 453*b* (i.e., the plate 420 will be thermally decoupled from the DC link conductors). Further, because induction is the form of energy transfer, it is the time rate of change of the magnetic flux that creates a proportional response in the DC link conductors 451*a*, 451*b*, 453*a*, 453*b*, which, in turn, permits the transmission of lower frequency signals while impeding higher frequency AC signals.

Figure 5A:
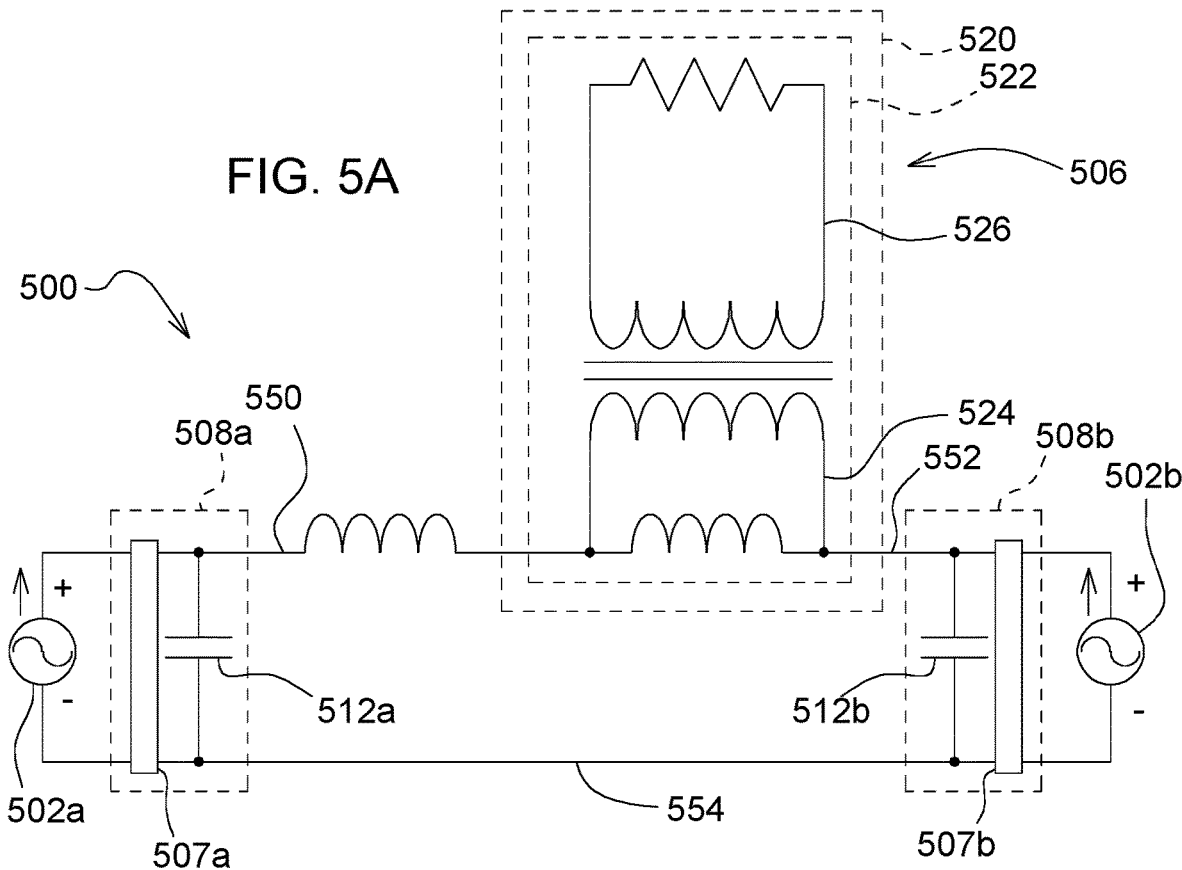
FIG. 5A is a schematic illustration of a dual inverter system including a direct current bus and a damping element according to an embodiment.
Figure 5B:
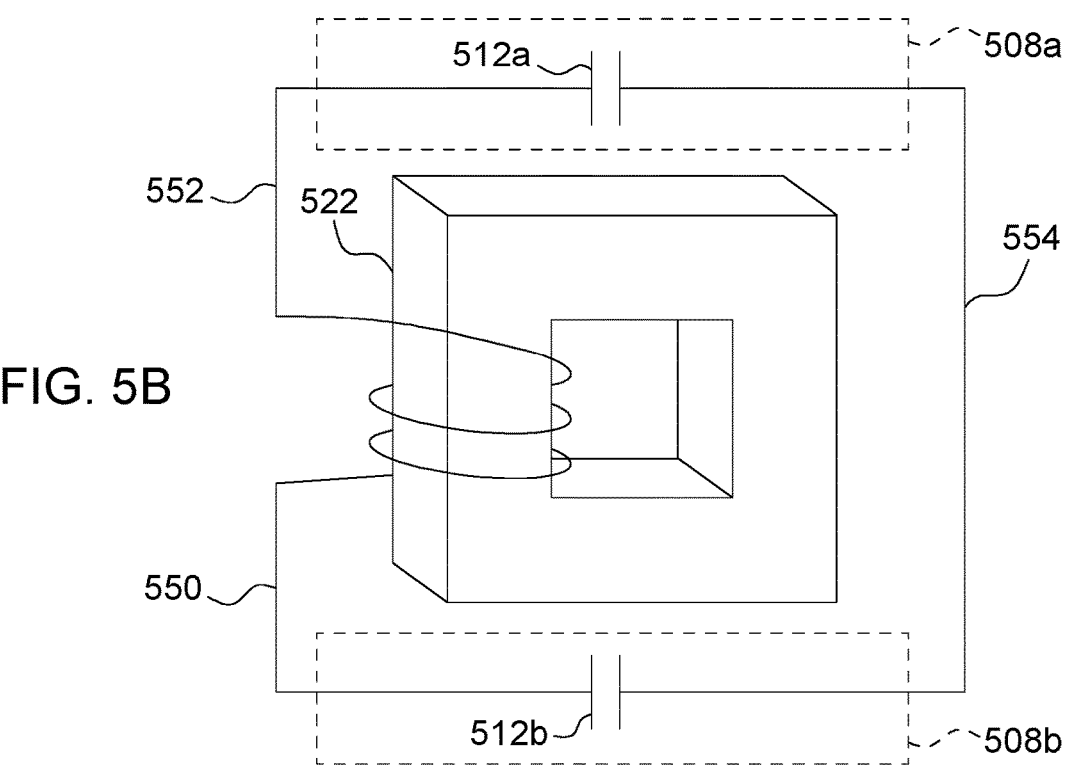
FIG. 5B is a schematic illustration of a damping element arranged in the dual inverter system of FIG. 5A according to an embodiment.

Referring to FIGS. 5A and 5B, a DC bus 550, 552 and corresponding damping element 506 for a dual inverter system 500 is shown according to an embodiment. In FIG. 5A, a schematic illustration of the dual inverter system 500 is shown and the damping element 506 is shown in FIG. 5B. It should be noted that the dual inverter system 500 is substantially similar to systems 200, therefore like reference numerals will be used to describe similar features and components. In contrast to system 200, the damping element 506 of system 500 can comprise an electrical transfer device 520 coupled to at least one DC link conductor (e.g., DC link conductor 553) of the DC bus 550, 552. The DC bus 550, 552 can be electrically coupled to the bus capacitor 512*a*, 512*b* through the link conductors 553, 554. As shown in FIG. 5A, the respective bus capacitors 512*a*, 512*b* can be collectively arranged with one or more switching circuits (e.g., power switching circuit 507*a*, 507*b*) to form a first power inversion circuit 508*a* and a second power inversion circuit 508*b*.

In some embodiments, the electrical transfer device 520 can comprise a ferromagnetic core 522 or other suitable electronic devices. The primary circuit portion 524 is shown by winding 522, but the secondary circuit portion 526 is the core itself (522) and the eddy currents generated therein. In other embodiments, the electrical transfer device 520 can comprise a transformer having a gapped core of predetermined dimensions that is configured to prevent magnetic saturation.

As shown in FIG. 5B, the DC link conductor 553 can be wound around the primary circuit portion 524 of the ferromagnetic core 522, which can comprise a non-laminated solid core composed of a conductive material. In such an arrangement, a changing current in the DC link conductor 553 will induce strong eddy currents in the ferromagnetic core 522 such that power losses resulting from the eddy currents would operate to damp the system. Further, similar to the embodiments discussed above with reference to FIGS. 3A and 4A, the DC link conductor 553 will be thermally insulated from the ferromagnetic core 522.

Without in any way limiting the scope, interpretation, or application of the claims appearing below, a technical effect of one or more of the example embodiments disclosed herein is a system for damping DC bus resonance. The system is particularly advantageous in that it utilizes the generation of eddy currents to provide resonance damping of the system.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A system for providing resonance damping, the system comprising:
    a power generation circuit;
    a direct current (DC) bus coupled to the power generation circuit, the DC bus comprising a first link conductor and a second link conductor, wherein the first link conductor and the second link conductor are arranged such that a current induced in the first link conductor or the second link conductor generates a corresponding magnetic field having a plurality of magnetic flux lines that extend in a direction generally perpendicular to a first direction of current flow;
    at least one electronic circuit coupled to the DC bus that is configured to supply power to a load; and
    a damping element coupled to or arranged proximate to one or both of the first link conductor and the second link conductor, wherein the damping element is arranged such that the plurality of magnetic flux lines induces a plurality of eddy currents having a second direction of current flow in at least one surface of the damping element to provide resonance damping of the system.

2. The system of claim 1, wherein the damping element comprises a ferromagnetic or non-ferromagnetic component including one or more of the following: a plate, a tubular structure, a core element, combinations thereof, or others.

3. The system of claim 2, wherein the plate is disposed in substantially orthogonal relation to the magnetic flux lines generated by one or both of the first and second link conductors.

4. The system of claim 2, wherein the tubular structure is sized and dimensioned to enclose an outer periphery of one or both of the first and second link conductors respectively.

5. The system of claim 4, wherein the tubular structure comprises a non-continuous structure comprising a plurality of structural units adjacently arranged in spaced relation to one another.

6. The system of claim 4, wherein the tubular structure comprises a non-continuous structure having a gapped portion formed therein.

7. The system of claim 2, wherein the core element comprises a primary portion having at least one of the first or the second link conductors arranged to form one or more windings around the primary portion.

8. The system of claim 7, wherein the core element comprises a ferromagnetic core comprising a non-laminated conductive material.

9. The system of claim 2, wherein the core element comprises a gapped core.

10. The system of claim 1, wherein the damping element is thermally decoupled from the first and second link conductors of the DC bus conductors.

11. The system of claim 1, wherein the electronic circuit comprises a power inversion circuit comprising two or more inverters or active rectifiers or DC-to-DC converters or a combination coupled in parallel relation on the DC bus.

12. The system of claim 1, wherein the power generation circuit comprises a DC power source.

13. The system of claim 1, wherein the load includes a three-phase electric machine.

14. The system of claim 1, wherein the first direction of current flow is opposite that of the second direction of current flow.

15. A method for providing resonance damping, the method comprising:
    generating a magnetic field having a plurality of flux lines by inducing a current via a power generation circuit into at least one link conductor;
    disposing a damping element proximate to or on the at least one link conductor such that the plurality of flux lines extend generally perpendicular to one or more internal or external surfaces of the damping element;

inducing a plurality of eddy currents in the damping element having a direction of flow that is substantially orthogonal to the plurality of flux lines; and providing resonance damping of high frequency resonances utilizing the plurality of eddy currents.

16. The method of claim 15, wherein disposing a damping element proximate to or on the at least one link conductor comprises disposing the damping element in parallel relationship to the at least one link conductor.

17. The method of claim 15, wherein the damping element comprises one or more of the following: a metallic plate, a tubular structure, a core element, or combinations thereof.

18. The method of claim 16, wherein inducing a plurality of eddy currents includes inducing a plurality of eddy currents in a primary portion of the core element.

19. The method of claim 16, wherein inducing a plurality of eddy currents includes inducing a plurality of eddy currents in at least one surface of the metallic plate or the tubular structure.

* * * * *